US012456306B2

(12) United States Patent
Gautam et al.

(10) Patent No.: US 12,456,306 B2
(45) Date of Patent: Oct. 28, 2025

(54) IDENTIFYING PERSON OF INTEREST WITH AUGMENTED REALITY HEAD-UP DISPLAY

(71) Applicant: GM Global Technology Operations LLC, Detroit, MI (US)

(72) Inventors: Pallavi Gautam, Royal Oak, MI (US); Joseph F. Szczerba, Grand Blanc, MI (US); Robert C. Jablonski, Rochester, MI (US); Thomas A. Seder, Fraser, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 285 days.

(21) Appl. No.: 18/359,431

(22) Filed: Jul. 26, 2023

(65) Prior Publication Data

US 2025/0037474 A1    Jan. 30, 2025

(51) Int. Cl.
| | |
|---|---|
| *G06V 20/58* | (2022.01) |
| *B60K 35/10* | (2024.01) |
| *B60K 35/23* | (2024.01) |
| *B60K 35/28* | (2024.01) |
| *G02B 27/01* | (2006.01) |
| *G06F 3/01* | (2006.01) |
| *G06V 40/10* | (2022.01) |

(52) U.S. Cl.
CPC ............ *G06V 20/58* (2022.01); *B60K 35/10* (2024.01); *G02B 27/0101* (2013.01); *G02B 27/0179* (2013.01); *G06F 3/012* (2013.01); *G06F 3/013* (2013.01); *G06V 40/10* (2022.01); *B60K 35/23* (2024.01); *B60K 35/28* (2024.01); *B60K 2360/177* (2024.01); *B60K 2360/23* (2024.01); *B60K 2360/25* (2024.01); *B60K 2360/334* (2024.01); *G02B 2027/0138* (2013.01); *G02B 2027/014* (2013.01); *G02B 2027/0141* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 9,746,668 B2* | 8/2017 | Kim | G02B 27/0101 |
| 10,431,188 B1* | 10/2019 | Nelson | G09G 5/363 |
| 11,553,087 B1* | 1/2023 | Cannady | H04M 3/5133 |
| 2014/0070934 A1* | 3/2014 | Chau | B60K 35/20 |
| | | | 340/438 |
| 2018/0239134 A1* | 8/2018 | Franz | B60K 35/60 |
| 2020/0209623 A1* | 7/2020 | Kim | G03B 21/62 |
| 2023/0303031 A1* | 9/2023 | De Mola | B60R 25/104 |

(Continued)

*Primary Examiner* — Helen Zong
(74) *Attorney, Agent, or Firm* — Vivacqua Crane, PLLC

(57) ABSTRACT

A system for identifying a person of interest for an occupant within a vehicle with a head-up system includes a controller in communication with an external scene camera adapted to capture images of an external environment in proximity to the vehicle, identify at least one person of interest located within the external environment in proximity to the vehicle, characterize the at least one person of interest, determine appropriate augmentation graphics related to the identified at least one person of interest to be displayed for the occupant, and display, with the head-up display system, the augmentation graphics onto an inner surface of a windshield of the vehicle.

18 Claims, 5 Drawing Sheets

(56) References Cited

U.S. PATENT DOCUMENTS

| | | | |
|---|---|---|---|
| 2023/0322080 A1* | 10/2023 | Liebau | G08G 1/096791 |
| | | | 701/36 |
| 2023/0380694 A1* | 11/2023 | Proske | A61B 90/30 |
| 2024/0416921 A1* | 12/2024 | Batie | B60W 40/08 |

* cited by examiner

IDENTIFYING PERSON OF INTEREST WITH AUGMENTED REALITY HEAD-UP DISPLAY

The present disclosure relates to systems and methods for displaying appropriate augmentation graphics in a vehicle to alert an occupant therein to the presence of persons of interest in proximity to the vehicle.

To increase occupant awareness and convenience, vehicles may be equipped with display systems which are configured to provide information about an environment surrounding the vehicle to an occupant. Display systems may use human-interface devices, such as, for example, touchscreens, to provide information to the occupant. Display systems may also use head-up displays (HUD) to provide information to the occupant. To control and/or illuminate the HUD, a graphics projector may be used to project graphics upon a surface (e.g., a windscreen) of the vehicle. However, current graphics projectors may utilize high-intensity, concentrated light sources, such as, for example, lasers. High-intensity, concentrated light sources may cause the occupant discomfort when reflecting off of surfaces of the vehicle. Additionally, high-intensity, concentrated light sources may increase weight and resource use of the vehicle.

Thus, while current graphics projectors achieve their intended purpose, there is a need for a new and improved system for graphics projection for a vehicle which is adapted to display appropriate augmentation graphics to alert an inform an occupant to the presence and nature of persons of interest in proximity to the vehicle.

SUMMARY

According to several aspects of the present disclosure, a method of identifying a person of interest for an occupant within a vehicle with a head-up system includes: identifying, with a controller in communication with an external scene camera adapted to capture images of an external environment in proximity to the vehicle, at least one person of interest located within the external environment in proximity to the vehicle; characterizing, with the controller, the at least one person of interest; determining, with the controller, appropriate augmentation graphics related to the identified at least one person of interest to be displayed for the occupant; and displaying, with the head-up display system, the augmentation graphics onto an inner surface of a windshield of the vehicle.

According to another aspect, the method further includes sending, via a communication network within the vehicle, information related to the characterization of the at least one person of interest to a vehicle control module of the vehicle, and initiating, with the vehicle control module, vehicle maneuvers based on the characterization of the identified at least one person of interest.

According to another aspect, the identifying, with a controller in communication with an external scene camera adapted to capture images of an external environment in proximity to the vehicle, at least one person of interest located within the external environment in proximity to the vehicle further includes: scanning, with the external scene camera, the external environment in proximity to the vehicle; and identifying, with a computer vision algorithm within the controller, people located within the external environment in proximity to the vehicle.

According to another aspect, the identifying, with a computer vision algorithm within the controller, people located within the external environment in proximity to the vehicle further includes: collecting, from remote sources in communication with the controller, data related to the identified people located within the external environment in proximity to the vehicle; and identifying, with the controller, at least one person of interest within the identified people based on the data collected from the remote sources.

According to another aspect, the collecting, from remote sources in communication with the controller, data related to the identified people located within the external environment in proximity to the vehicle further includes collecting data related to the identified people located within the external environment in proximity to the vehicle from at least one of social media applications, criminal records, business networks, motor vehicle records, real estate records, voting records, and school records.

According to another aspect, the identifying, with the controller, at least one person of interest within the identified people based on the data collected from the remote sources further includes identifying at least one person of interest within the identified people who are at least one of: a follower of the occupant on social media, followed by the occupant on social media, a friend of the occupant, a family member of the occupant, a celebrity, a co-worker of the occupant, a person who has similar interest as the occupant, and a person who works in the same industry as the occupant.

According to another aspect, the characterizing, with the controller, the at least one person of interest further includes characterizing, with a cloud computing algorithm in communication with the controller, the at least one person of interest as one of friendly or not-friendly based on the data related to the identified people collected from the remote sources.

According to another aspect, the displaying, with the head-up display system, the appropriate augmentation graphics onto an inner surface of a windshield of the vehicle further includes: determining, with an occupant monitoring system, a location of the occupant's head and eyes; calculating a location to display the appropriate augmentation graphics on the inner surface of the windshield based on the position of the head and eyes of the occupant, wherein the augmentation graphics appear in proximity to the identified at least one person of interest when viewed by the occupant; and displaying the appropriate augmentation graphics on the inner surface of the windshield by: projecting, with a light source of a digital light projector, an excitation light; focusing, with a condensing lens, the excitation light from the light source; splitting, with a color filter, the focused excitation light into red, green and blue light; focusing, with a shaping lens, the excitation light passing through the color filter; re-directing, with a digital micro-mirror device (DMD), the excitation light; receiving, with a projection lens, the excitation light from the digital micro-mirror device; and projecting, with the projection lens, the excitation light to the inner surface of the windshield at a location on the inner surface of the windshield based on the position of the head and eyes of the occupant, wherein light emitting particles within the windshield emit visible light in response to absorbing the excitation light, and the appropriate augmentation graphics appear in proximity to the identified at least one person of interest when viewed by the occupant.

According to another aspect, the method further includes: determining, with the controller, if the windshield is in a privacy mode, wherein the windshield is opaque and the external environment is not visible to the occupant through the windshield and the occupant is not visible to persons within the external environment; and when the windshield is in the privacy mode, deactivating the privacy mode prior to displaying appropriate augmentation graphics on the inner surface of the windshield.

According to several aspects of the present disclosure, a system for identifying a person of interest for an occupant within a vehicle with a head-up system includes: a controller in communication with an external scene camera adapted to: capture images of an external environment in proximity to the vehicle; identify at least one person of interest located within the external environment in proximity to the vehicle; characterize the at least one person of interest; determine appropriate augmentation graphics related to the identified at least one person of interest to be displayed for the occupant; and display, with the head-up display system, the augmentation graphics onto an inner surface of a windshield of the vehicle.

According to another aspect the system further includes a communication network within the vehicle adapted to send information related to the characterization of the at least one person of interest to a vehicle control module of the vehicle, the vehicle control module adapted to initiate vehicle maneuvers based on the characterization of the identified at least one person of interest.

According to another aspect, when identifying at least one person of interest located within the external environment in proximity to the vehicle, the controller is further adapted to: scan, with the external scene camera, the external environment in proximity to the vehicle; and identify, with a computer vision algorithm within the controller, people located within the external environment in proximity to the vehicle.

According to another aspect, when identifying at least one person of interest located within the external environment in proximity to the vehicle, the controller is further adapted to: collect, from remote sources in communication with the controller, data related to the identified people located within the external environment in proximity to the vehicle; and identify at least one person of interest within the identified people based on the data collected from the remote sources.

According to another aspect, the controller is adapted to collect data related to the identified people located within the external environment in proximity to the vehicle from at least one of social media applications, criminal records, business networks, motor vehicle records, real estate records, voting records, and school records.

According to another aspect, the controller is adapted to identify at least one person of interest who is at least one of: a follower of the occupant on social media, followed by the occupant on social media, a friend of the occupant, a family member of the occupant, a celebrity, a co-worker of the occupant, a person who has similar interest as the occupant, and a person who works in the same industry as the occupant.

According to another aspect, the controller is adapted to utilize a cloud computing algorithm in communication with the controller to characterize the at least one person of interest as one of friendly or not-friendly based on the data related to the identified people collected from the remote sources.

According to another aspect, the digital light projector includes: a light source adapted to project an excitation light; a condensing lens adapted to focus the excitation light from the light source; a color filter adapted to split the focused excitation light into red, green and blue light; a shaping lens adapted to focus the excitation light passing through the color filter; a digital micro-mirror device (DMD) adapted to re-direct the excitation light; and a projection lens adapted to receive the excitation light from the digital micro-mirror device and project the excitation light to the inner surface of the windshield; and, the head-up system includes an occupant monitoring system adapted to receive information related to a position of the head and eyes of the occupant within the vehicle, wherein the digital light projector is adapted to display the augmentation graphics at a location on the inner surface of the windshield based on the position of the head and eyes of the occupant such that the augmentation graphics appear in proximity to the identified at least one person of interest when viewed by the occupant.

According to another aspect, the windshield is operable in a privacy mode, wherein the windshield is opaque and the external environment is not visible to the occupant through the windshield and the occupant is not visible to persons within the external environment, the controller adapted to determine if the windshield is in a privacy mode, and, when the windshield is in the privacy mode, deactivate the privacy mode prior to displaying appropriate augmentation graphics on the inner surface of the windshield.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 7A is a schematic cross section of a windshield having a layer of liquid crystals therein, wherein an electrical current is passed through the layer of liquid crystals and light is allowed to pass through;

FIG. 7B is the schematic cross section shown in FIG. 7A, wherein the electrical current is absent and light is blocks from passing through.

Figure 1:
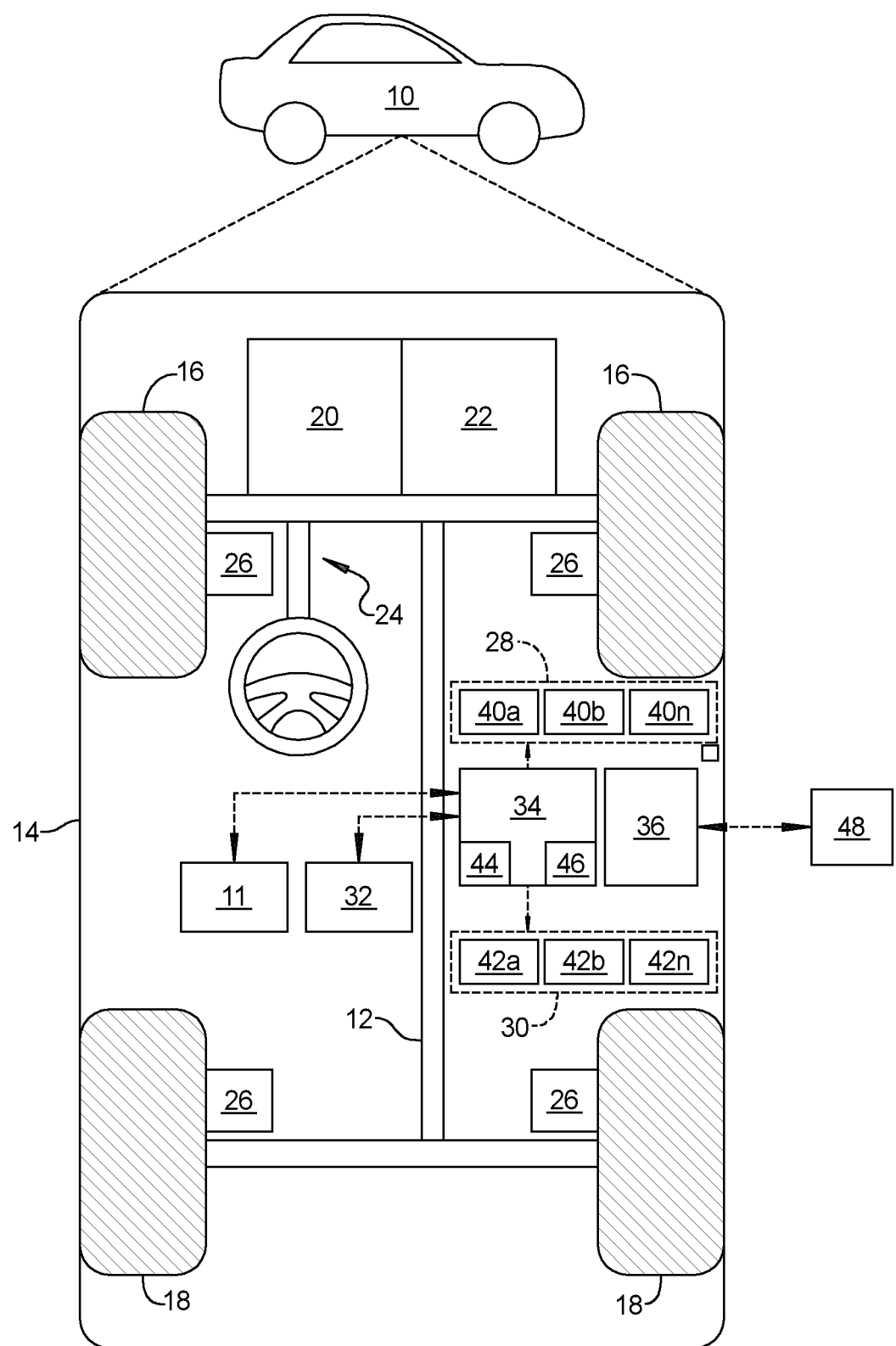
FIG. 1 is a schematic diagram of a vehicle having a system in accordance with an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated head-up display system within the vehicle 10 in accordance with various embodiments. In general, the head-up display system 11 works in conjunction with other systems within the vehicle 10 to display various information and infotainment content for the passenger. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, a vehicle controller 34, and a communication system 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10. In a non-limiting example wherein the plurality of sensing devices 40a-40n includes a camera, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities.

In one example, at least one of the plurality of sensing devices 40a-40n is affixed inside of the vehicle 10, for example, in a headliner of the vehicle 10, having a view through the windshield 56 of the vehicle 10. In another example, at least one of the plurality of sensing devices 40a-40n is affixed outside of the vehicle 10, for example, on a roof of the vehicle 10, having a view of the environment surrounding the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The communication system 36 is configured to wirelessly communicate information to and from other remote entities 48, such as but not limited to, other vehicles ("V2V" communication) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
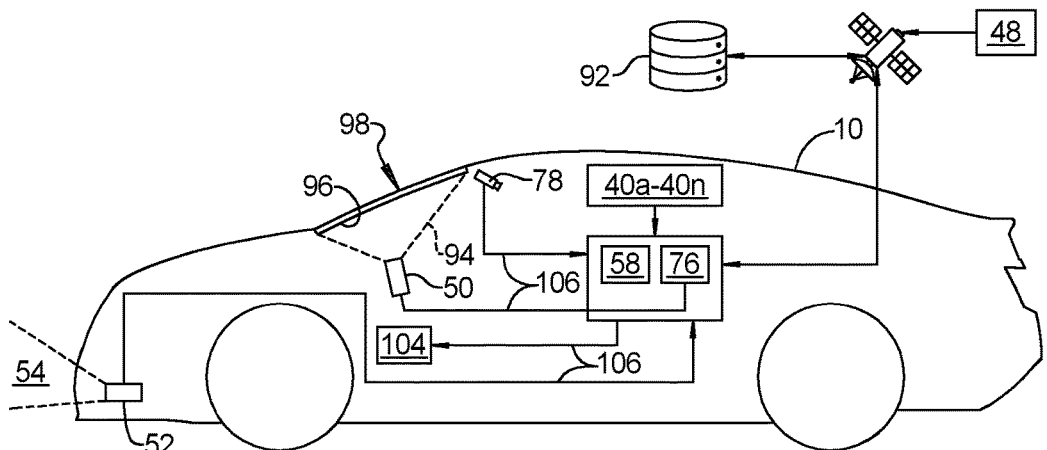
FIG. 2 is a schematic side view of the vehicle shown in FIG. 1.

Referring to FIG. 2, the controller 34 of the head-up system 11 is in communication with an external scene camera 52. The various sensing devices 40a-40n collect and provide information to the controller 34. The sensing devices 40a-40n include the external scene camera 52 or image capturing device taking periodic or sequential images representing a view from the vehicle 10. The controller 34 is adapted to capture images of an external environment 54 in proximity to the vehicle 10 with the external scene camera 52. The controller 34 is further adapted to identify at least one person of interest 56 located within the external environment 54 in proximity to the vehicle 10. When identifying at least one person of interest 56 located within the external environment 54 in proximity to the vehicle 10, the controller 34 is further adapted to scan, with the external scene camera 52, the external environment 54 in proximity to the vehicle 10, and to identify, with a computer vision algorithm 58 within the controller 34, people located within the external environment 54 in proximity to the vehicle 10.

Figure 3:
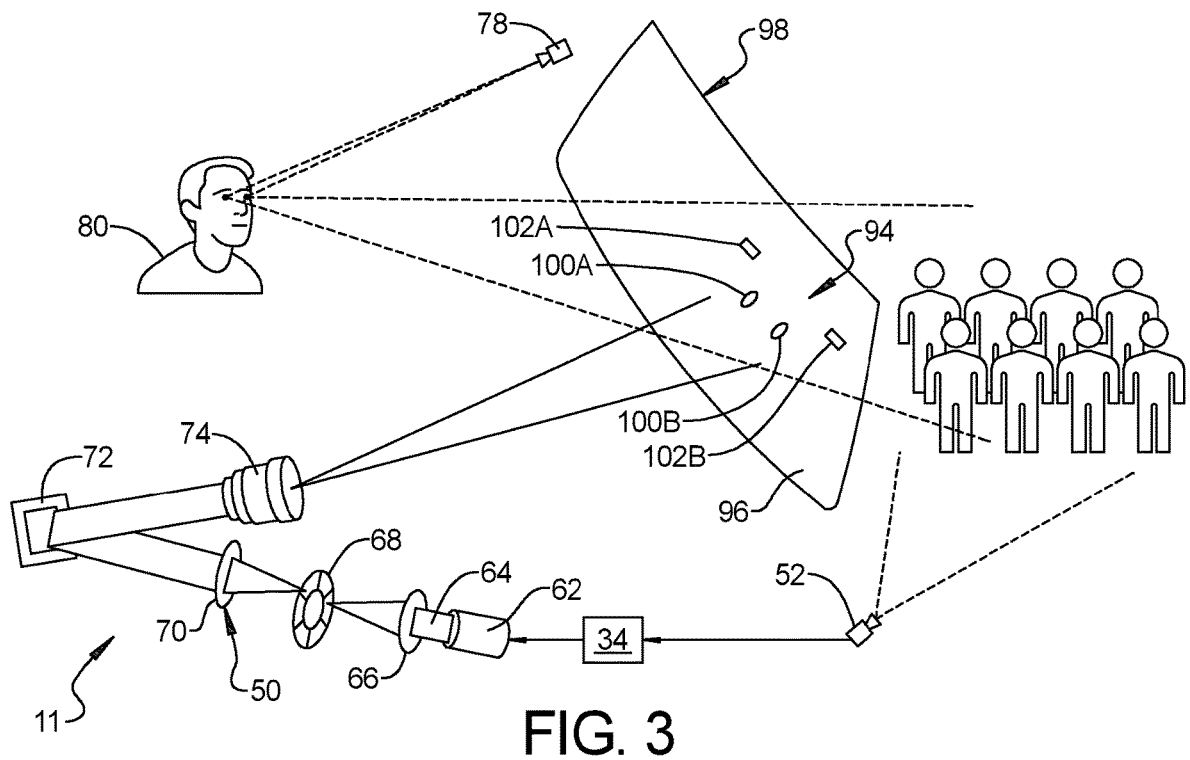
FIG. 3 is a schematic diagram of a system according to an exemplary embodiment.

Referring to FIG. 3, the external scene camera 52 captures images of a group of people 60 standing in proximity to the vehicle 10. The controller 34, using the computer vision algorithm 58, identifies the individual people comprising the group 60, and further, collects, from remote sources 48 in communication with the controller 34, data related to the identified people located within the external environment 54 in proximity to the vehicle 10. In an exemplary embodiment, the controller 34 accesses remote sources 48 including at least one of social media applications, criminal records, business networks, motor vehicle records, real estate records, voting records, and school records to identify the individuals comprising the group of people 60. Such remote sources 48 can includes any publicly accessible database.

The controller 34 is further adapted to identify at least one person of interest 56 within the identified group of people 60 based on the data collected from the remote sources 48. By analyzing the data collected from the remote sources 48, the controller 34 identifies individuals within the group of people 60 who are a person of interest 56 to the occupant 80 within the vehicle 10. A person of interest 56 may be any one or more of the following: a follower of the occupant 80 on social media, followed by the occupant 80 on social media, a friend of the occupant 80, a family member of the occupant 80, a celebrity, a co-worker of the occupant 80, a person who has similar interest as the occupant 80, or a person who works in the same industry as the occupant 80. Any person who has some connection to the occupant 80, as determined by the controller 34 analyzing data from the remote sources 48, may be identified as a person of interest 56 to the occupant 80.

The controller 34 is further adapted to characterize the at least one person of interest 56. In an exemplary embodiment, the controller 34 is adapted to utilize a cloud computing algorithm 92 in communication with the controller 34 to characterize the at least one person of interest 56 as one of friendly or not-friendly based on the data related to the identified group of people 60 collected from the remote sources 48. The controller 34 analyzes the data collected from remote sources 48 to determine if each one of the identified persons of interest 56 have positive or negative feelings toward the occupant 80. The controller 34 may identify a person of interest 56 as un-friendly or even hostile depending on communications or comments made by the person of interest 56 and/or the occupant 80 on social media or other remote sources 48.

In an exemplary embodiment, after characterizing any persons of interest 56, the controller 34 is adapted to send, via a communication network 106 within the vehicle 10, information related to the characterization of the at least one person of interest 56 to a vehicle control module 104 of the vehicle 10. The vehicle control module 104 is adapted to initiate vehicle maneuvers based on the characterization of the identified at least one person of interest 56. For example, if the identified person of interest 56 is friendly, the vehicle control module 104 may cause the vehicle 10 to stop, giving the occupant 80 an opportunity to interact with the identified person of interest 56. Further, the controller 34 and the vehicle control module 104 may prompt vehicle infotainment systems to provide audible cues to alert the occupant 80 of the presence of a friendly person of interest 56. Further, the controller 34 may initiate internal and external speakers and microphones to allow the occupant to communicate with the identified person of interest 56. Alternatively, if the identified person of interest 56 is un-friendly, the controller 34 and the vehicle control module 104 may cause the vehicle 10 to keep moving past the un-friendly person of interest 56, or to alter the route of the vehicle 10, to avoid the un-friendly person of interest 56 altogether. Here also, the controller 34 and the vehicle control module 104 may prompt vehicle infotainment systems to provide audible cue to alert the occupant 80 of the presence of the un-friendly person of interest 56.

Figure 4:
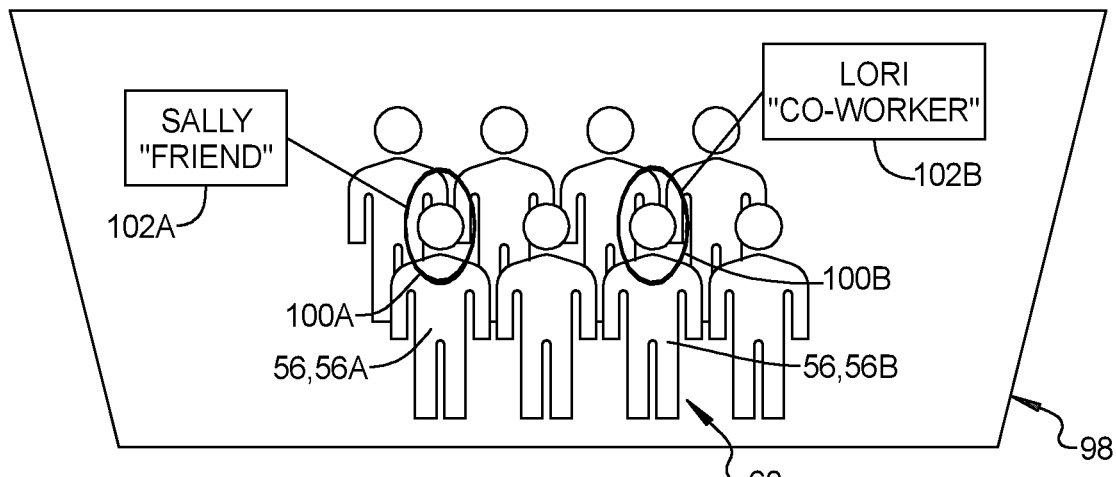
FIG. 4 is a schematic side view of a windshield of the vehicle as viewed by an occupant within the vehicle.

The controller 34 is further adapted to determine appropriate augmentation graphics 94 related to the identified at least one person or persons of interest 56 to be displayed for the occupant 80, and to display, with the head-up display system 11, the appropriate augmentation graphics 94 onto an inner surface 96 of a windshield 98 of the vehicle 10. Appropriate augmentation graphics 94 are adapted to inform the occupant 80 of the identity and categorization of the identified persons of interest 56. Referring to FIG. 4, the windshield 98, as viewed by the occupant 80 is shown. The occupant 80 can see the group of people 60 standing in proximity to the vehicle 10. The system 11 has captured an image of the group of people 60, accessed remote sources 48 to identify the individuals and has identified two persons of interest 56 for the occupant 80. The system 11 has then displayed appropriate augmentation graphics 94 for each of the two persons of interest 56.

For a first person of interest 56A, the system 11 has identified that the individual is Sally 56A, a friend of the occupant 80 as indicated by labels and conversations from social media sites. The proper augmentation graphic 94 for Sally 56A includes an outline 100A to distinguish Sally 56A as a person of interest 56 to the occupant 80. Further, the appropriate augmentation graphic 94 for Sally 56A includes a text box 102A attached to the outline 100A including descriptive information about Sally 56A. As shown in FIG. 4, the text box 102A includes Sally's name, "Sally", as well as the word "Friend", indicating that Sally 56A is a friend of the occupant 80. The appropriate augmentation graphic 94 may be tailored further based on the categorization of Sally 56A. If the system 11 categorizes Sally 56A as "friendly", then the outline 100A may be displayed in a color indicating such, for example, the outline 100A may be green.

For a second person of interest 56B, the system 11 has identified that the individual is Lori 56B, a co-worker of the occupant 80 as indicated by labels and conversations from social media sites, and possibly a website of their employer. The proper augmentation graphic 94 for Lori 56B includes an outline 100B to distinguish Lori 56B as a person of interest 56 to the occupant 80. Further, the appropriate augmentation graphic 94 for Lori 56B includes a text box 102B attached to the outline 100B including descriptive information about Lori 56B. As shown in FIG. 4, the text box 102B includes Lori's name, "Lori", as well as the word "Co-Worker", indicating that Sally 56B is a co-worker of the occupant 80. The appropriate augmentation graphic 94 may be tailored further based on the categorization of Lori 56B. If the system 11 categorizes Lori 56B as "un-friendly", then the outline 100B may be displayed in a color indicating such, for example, the outline 100B may be red.

It should be understood that the appropriate augmentation graphic 94 may include any information deemed relevant to the occupant 80. In an exemplary embodiment, the amount of information provided in a text box 102A, 102B associated with an identified person of interest 56 may include more or less details depending on preferences of the occupant 80, and the nature of the information. If the system 11 identifies a person of interest 56 is particularly hostile toward the occupant 80, detailed information may be provided regardless of preferences selected by the occupant 80. For example, if the occupant 80 is a celebrity or politician, and the system 11 identifies that a person of interest 56 in proximity to the vehicle 10 has made threats against the occupant 80, an appropriate augmentation graphic 94 may be adapted to ensure that the occupant 80 is made aware of such information. In such circumstances, the system 11 may provide an appropriate augmentation graphic 94 including an outline that is of a color (i.e. red) or alternating colors and/or includes dynamic features, such as pulsing or increasing brightness/intensity.

Referring again to FIG. 3, the head-up display system 11 includes a digital light projector (DLP) 50 adapted to project appropriate augmentation graphics 94 onto the inner surface 96 of the windshield 98 of the vehicle 10. The DLP 50 projects appropriate augmentation graphics 94 that contain various information, as described above. The DLP 50 is capable of projecting two-dimensional and three-dimensional images that depict objects such as pedestrians, buildings and other vehicles in the external environment 54 surrounding the vehicle 10 that may be includes in appropriate augmentation graphics 94. In an exemplary embodiment, the DLP 50 includes a light source 62 adapted to project an excitation light 64, a condensing lens 66 adapted to focus the excitation light 64 from the light source 62, a color filter 68 (color wheel) adapted to split the focused excitation light 64 into red, green and blue light, a shaping lens 70 adapted to focus the excitation light 64 passing through the color filter 68, a digital micro-mirror device (DMD) 72 adapted to re-direct the excitation light 64, and a projection lens 74 adapted to receive the excitation light 64 from the digital micro-mirror device (DMD) 72 and project the excitation light 64 to the inner surface 96 of the windshield 98.

Referring again to FIG. 2, the vehicle controller 34 includes a DLP engine 76. The DLP engine 76 includes a programmable processor including programming to monitor various inputs and determine what information should be included within appropriate augmentation graphics 94. The DLP engine 76 can communication directly with various systems and components, or the DLP engine 76 can alternatively or additionally communicate over a LAN/CAN system. The DLP engine 76 utilizes information regarding the operational environment of the vehicle 10 derived from a number of inputs.

The windshield 98 is equipped with features capable of displaying appropriate augmentation graphics 94 projected thereupon while remaining transparent or substantially transparent such that the occupant 80 of the vehicle 10 can clearly observe outside of the vehicle 10 through the windshield 98. It should be understood that, as depicted, the windshield 98 is in the front of the vehicle 10, other surfaces within the vehicle 10 could be used for projection, including side windows and a rear window. Additionally, the view on the front windshield 98 could be continued upon the front vehicle "A-pillars" and onto the side windows as a continuous image.

The DLP engine 76 includes display software or programming translating requests to display information from the DLP engine 76 in graphical representations describing the information. The DLP engine 76 includes programming to compensate for the curved and tilted surface of the windshield 98 and any other surfaces onto which the appropriate augmentation graphics 94 are to be projected. The DLP engine 76 controls the light source 62 which includes a laser or projector device producing an excitation light 64 to project the appropriate augmentation graphics 94.

An occupant monitoring system 78 includes sensors known in the art to approximate a location of the head of an occupant 80 and further the orientation or gaze location of the eyes of the occupant 80. Based upon the output of the occupant monitoring system 78 and input data tracking location information regarding the environment around the vehicle 10, the DLP engine 76 can accurately position the appropriate augmentation graphics 94 such that the occupant 80 sees the appropriate augmentation graphics 94 overlaid with visual images (identified person of interest 56) through the windshield 98. Referring to FIG. 3, the outline 100A and text box 102A for the first identified person of interest 56A and the outline 100B and text box 102B for the second identified person of interest 56B are displayed on the inner surface 96 of the windshield 98 at a position between the eyes of the occupant 80 and the first and second identified person of interest 56A, 56B, such that, referring to FIG. 4, the outline 100A and text box 102A for the first person of interest 56A appears to the occupant 80 to be located in proper relation to the first person of interest 56A, and the outline 100B and text box 102B for the second person of interest 56B appears to the occupant 80 to be located in proper relation to the second person of interest 56B.

The system 11 described above includes eye sensing and head sensing devices allowing estimation of eye location, allowing registration of images upon the windshield 98 such that the images correspond to a view of the occupant 80. However, it will be appreciated that estimation of head and eye location can be achieved through a number of methods. For example, in a process similar to adjusting rearview mirrors, an operator can use a calibration routine upon entering a vehicle to align graphics to a detected object. In another embodiment, seat position longitudinally in the vehicle 10 can be used to estimate a position of the occupant's 80 head. In another embodiment, manual adjustment of a rearview mirror or mirrors can be used to estimate location of an occupant's 80 eyes. It will be appreciated that a combination of methods, for example, seat position and mirror adjustment angle, can be utilized to estimate occupant 80 head location with improved accuracy. Many methods to accomplish accurate registration of graphics upon the windshield 98 are contemplated, and the disclosure is not intended to be limited to the particular embodiments described herein.

Figure 5:
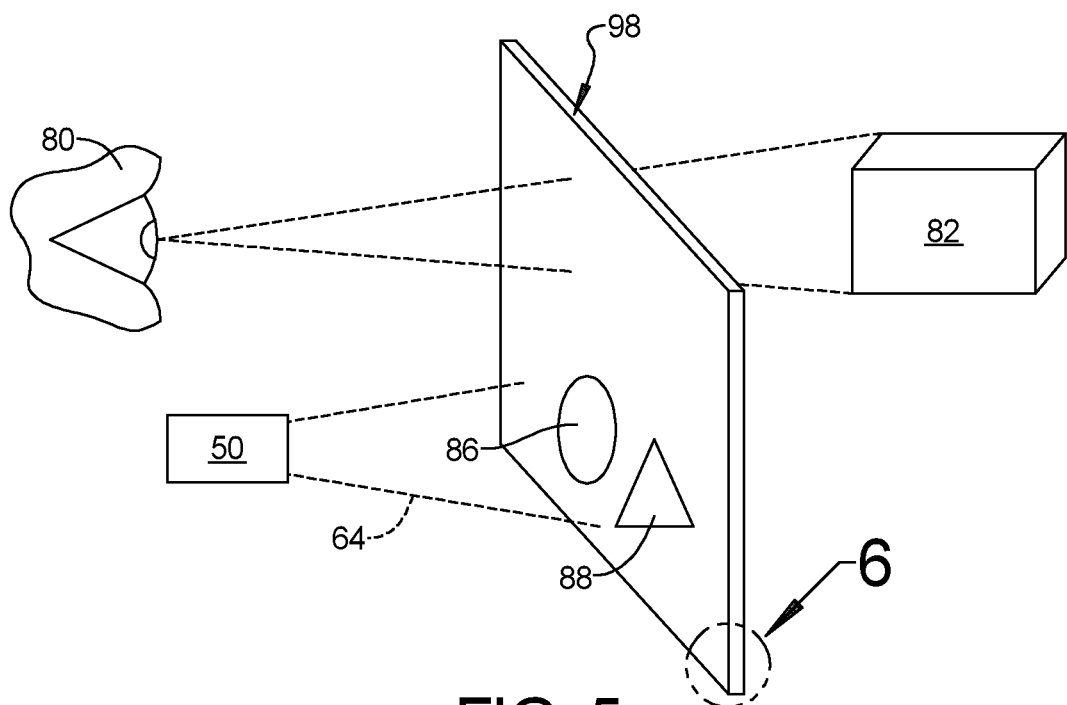
FIG. 5 is schematic illustration of a substrate for the windshield of the vehicle according to an exemplary embodiment.
Figure 6:
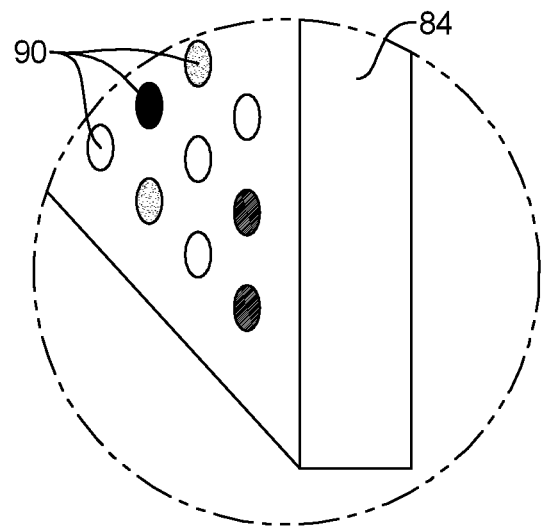
FIG. 6 is a enlarged portion of FIG. 4, as indicated by the circle labelled "FIG. 6" in FIG. 4.

The windshield 98 functions as a medium through which relevant features are observable while serving as a display device upon which the appropriate augmentation graphics 94 may be displayed. The windshield 98 is both transparent and capable of displaying images projected by an excitation light 64. Referring to FIG. 5 and FIG. 6, an occupant 80 is able to see an arbitrary object (e.g. cube 82) through a substrate 84 positioned on the windshield 98. The substrate 84 may be transparent or substantially transparent. While the occupant 80 sees the arbitrary object 82 through the substrate 84, the occupant 80 can also see images (e.g. circle 86 and triangle 88) that are created at the substrate 84. The substrate 84 may be part of the windshield 98, a glass substrate, a plastic substrate, a polymer substrate, or other transparent (or substantially transparent) medium that would be appreciated by one of ordinary skill in the art. Other substrates may complement the substrate 84 to provide for tinting, substrate protection, light filtering (e.g. filtering external ultraviolet light), and other functions.

FIG. 5 depicts illumination of transparent displays illuminated with excitation light 64 (e.g. ultraviolet light or infrared light) from a light source 62. The substrate 84 receives excitation light 64 from the light source 62. The received excitation light 64 may be absorbed by light emitting material 90 at the substrate 84. When the light emitting material receives the excitation light 64, the light emitting material 90 emits visible light. Accordingly, images (e.g. circle 86 and triangle 88) may be created at the substrate 84 by selectively illuminating the substrate 84 with excitation light 64.

In an exemplary embodiment, the light emitting material 90 includes transparent phosphors that are embedded into the substrate 84. The transparent phosphors are light emitting particles which fluoresce in response to being excited by the excitation light 64. In an exemplary embodiment, the transparent phosphors are red, green, and blue (RGB) phosphors, allowing full color. The use of monochrome and/or two-color phosphors is also within the scope of the present disclosure. When excitation light 64 is absorbed by the transparent phosphors, visible light is emitted by the transparent phosphors. The excitation light 64 is provided by the light source 62. Use of the substrate 84 and light emitting material 90 to display graphics is discussed in greater detail in U.S. application Ser. No. 17/749,464 titled "HYBRID AUGMENTED REALITY HEAD-UP DISPLAY FOR CREATING AN EDGE-TO-EDGE AUGMENTED REALITY VIEW" filed on May 20, 2022, the entire contents of which is hereby incorporated by reference.

The excitation light 64 may be ultraviolet light, in accordance with embodiments of the present disclosure. If the excitation light 64 is ultraviolet light, then when the light emitting material 90 emits visible light in response to the ultraviolet light, a down-conversion physical phenomenon occurs. Specifically, ultraviolet light has a shorter wavelength and higher energy than visible light. Accordingly, when the light emitting material 90 absorbs the ultraviolet light and emits lower energy visible light, the ultraviolet light is down-converted to visible light because the ultraviolet light's energy level goes down when it is converted into visible light.

It should be understood, other technology could also be used, such as a holographic grating (Bragg gratings) based technology which uses visible light projectors, wherein RGB LEDs are used to make a vector graphics projector and an RGB-DLP projector.

As shown in FIG. 2 and FIG. 3, the excitation light 64 is output by the light source 62 of the DLP 50. In an exemplary embodiment, the light source 62 is a micro-mirror array (MMA) projector (e.g. a digital light processing (DLP) projector 50). In the DLP 50, the appropriate augmentation graphics 94 are created by microscopically small mirrors laid out in a matrix on a semiconductor chip within the DMD 72. An MMA projector that outputs ultraviolet light may be similar to a MMA projector that outputs visible light, except that the color filter 68 has light filters that are tailored to the ultraviolet light spectrum. In other embodiments, the DLP 50 is a liquid crystal display (LCD) projector. In embodiments, the DLP 50 may be a liquid crystal on silicon (LCOS) projector. In embodiments, the DLP 50 may be an analog projector (e.g. a slide film projector or a movie film projector). One of ordinary skill in the art would appreciate other types of projectors which may be used to project ultraviolet light on the substrate 84.

In an exemplary embodiment, the windshield 98 is operable in a privacy mode, wherein the windshield 98 is opaque and the external environment 54 is not visible to the occupant 80 through the windshield 98 and the occupant 80 is not visible to persons within the external environment 54. The controller 34 is adapted to determine if the windshield 98 is in a privacy mode, and, when the windshield 98 is in the privacy mode, deactivate the privacy mode prior to displaying appropriate augmentation graphics 94 on the inner surface 96 of the windshield 98.

Additionally, after characterization of any identified person of interest 56, the controller may activate or de-activate the privacy mode of the windshield 98 based on the characterization of the identified person or persons of interest 56. For example, if the system 11 identifies and characterizes a person of interest 56 as friendly, and the windshield 98 is in the privacy mode, the controller will de-activate the privacy mode of the windshield 98, allowing the occupant 80 to see the friendly person of interest 56 and allowing the friendly person of interest 56 to see the occupant 80. Alternatively, if the system 11 identifies and characterizes a person of interest 56 as un-friendly, and the windshield 98 is in the privacy mode, the controller will keep the windshield in the privacy mode. If the windshield 98 is not in the privacy mode, the controller will activate the privacy mode of the windshield 98, thus preventing the occupant 80 from seeing the un-friendly person of interest 56 and preventing the un-friendly person of interest 56 from seeing the occupant 80.

Figure 7A:
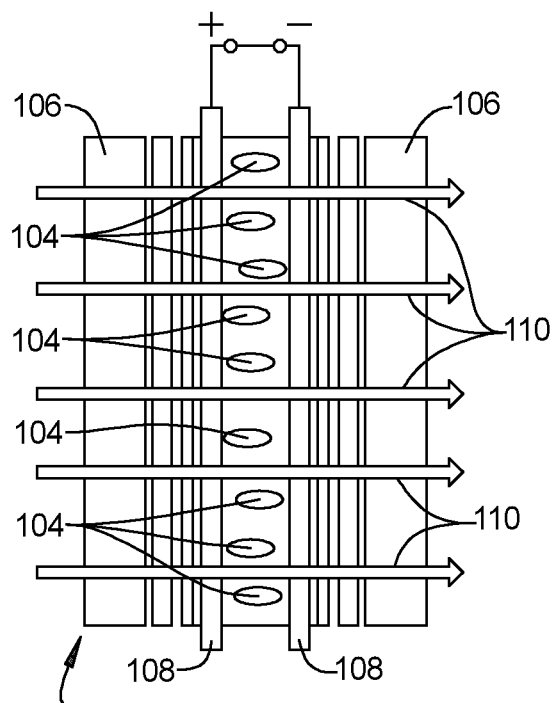
Figure 7B:
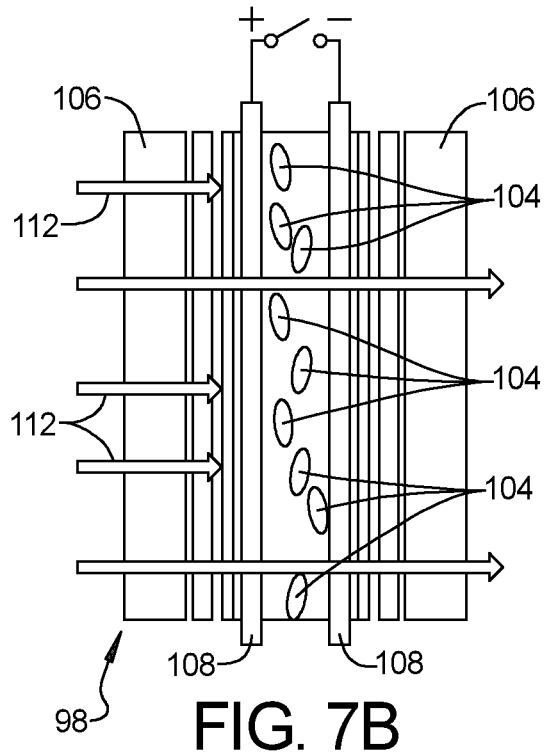

In an exemplary embodiment, to achieve privacy mode, a layer of liquid crystals 104 is positioned between two layers of glass 106 of the windshield 98. Referring to FIG. 7A, the liquid crystals 104 respond to an electrical charge, provided through conducting rods 108, by aligning parallel and letting light through, as indicated by arrows 110. Referring to FIG. 7B, when the electrical charge is absent, the liquid crystals 104 are randomly oriented, stopping much of the light from passing through the windshield 98, as indicated by arrows 112 and making the windshield 98 opaque or translucent. With liquid crystals 104, the glass is either clear or translucent, depending on the presence or absence of electrical current, and there is no intermediate setting.

Figure 8:
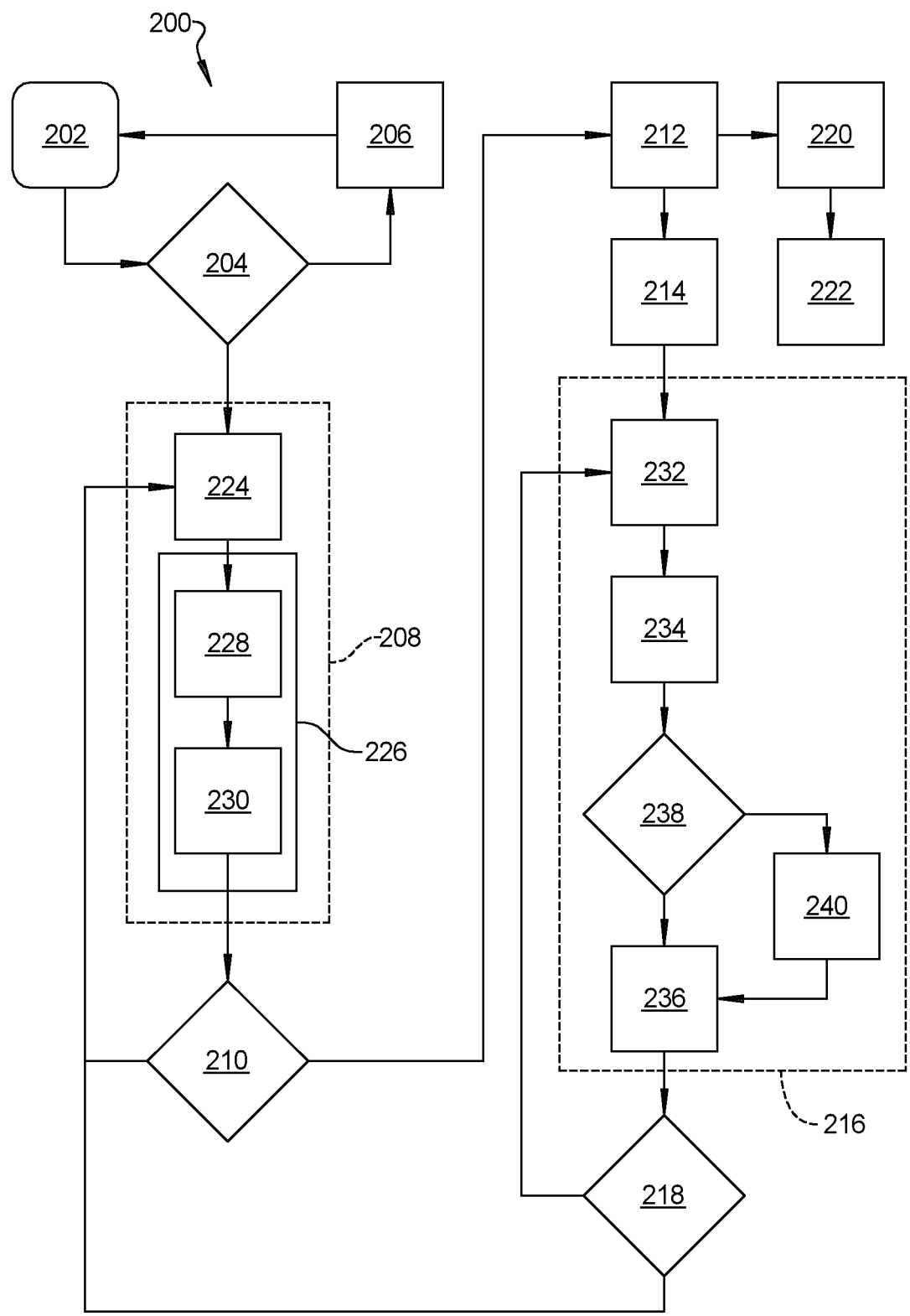
FIG. 8 is a flow chart illustrating a method according to an exemplary embodiment of the present disclosure.

Referring to FIG. 8, a method 200 of identifying a person of interest 56 for an occupant 80 within a vehicle 10 with a head-up system 11 is shown. Starting at block 202, an occupant 80 rides within the vehicle 10. Moving to block 204, if the occupant 80 does not initiate the system 11, then, moving to block 206, no action is taken, and the method 200 reverts back to block 202.

If, at block 204, the occupant 80 does initiate the system 11, then, moving to block 208, the method 200 includes identifying, with a controller 34 in communication with an external scene camera 52 adapted to capture images of an external environment 54 in proximity to the vehicle 10, at least one person of interest 56 located within the external environment 54 in proximity to the vehicle 10.

Moving to block 210, if the system 11 does not identify any person of interest 56, then, then no action is taken, and the system 11 reverts back to block 208. If, at block 210, the system 11 does detect at least one person of interest 56, then, moving to block 212, the method 200 includes characterizing, with the controller 34, the at least one person of interest 56. Moving to block 214, the method 200 further includes determining, with the controller 34, appropriate augmentation graphics 94 related to the identified at least one person of interest 56 to be displayed for the occupant 80, and, moving to block 216, displaying, with the head-up display system 11, the appropriate augmentation graphics 94 onto an inner surface 96 of a windshield 98 of the vehicle 10. Moving to block 218, the system 11 checks to see if any identified persons of interest 56 are still present. If no person of interest 56 is still present, then the method 200 reverts back to block 208, to identify, with the controller 34 any person of interest 56. If at least one person of interest is still present, then the method 200 reverts to block 216 and continues displaying, with the head-up display system 11, the appropriate augmentation graphics 94 onto the inner surface 96 of the windshield 98 of the vehicle 10.

In an exemplary embodiment, after characterizing, with the controller 34, the at least one person of interest 56 at block 212, the method further includes, moving to block 220, sending, via a communication network 106 within the vehicle 10, information related to the characterization of the at least one person of interest 56 to a vehicle control module 104 of the vehicle 10, and, moving to block 222, initiating, with the vehicle control module 104, vehicle maneuvers based on the characterization of the identified at least one person of interest 56.

In another exemplary embodiment, the identifying, with a controller in communication with an external scene camera adapted to capture images of an external environment in proximity to the vehicle, at least one person of interest located within the external environment in proximity to the vehicle at block 208 further includes, moving to block 224, scanning, with the external scene camera 52, the external environment 54 in proximity to the vehicle 10, and, moving to block 226, identifying, with a computer vision algorithm 58 within the controller 34, people located within the external environment 54 in proximity to the vehicle 10.

In another exemplary embodiment, the identifying, with a computer vision algorithm 58 within the controller 34, people located within the external environment 54 in proximity to the vehicle 10 at block 226 further includes, moving to block 228, collecting, from remote sources 48 in communication with the controller 34, data related to the identified people located within the external environment 54 in proximity to the vehicle 10, and, moving to block 230, identifying, with the controller 34, at least one person of interest 56 within the identified people based on the data collected from the remote sources 48. The collecting, from remote sources 48 in communication with the controller 34, data related to the identified people located within the external environment 54 in proximity to the vehicle 10 at block 228 further includes collecting data related to the identified people located within the external environment 54 in proximity to the vehicle 10 from at least one of social media applications, criminal records, business networks, motor vehicle records, real estate records, voting records, and school records. Further, the identifying, with the controller 34, at least one person of interest 56 within the identified people based on the data collected from the remote sources 48 at block 230 further includes identifying at least one person of interest 56 within the identified people who are at least one of: a follower of the occupant 80 on social media, followed by the occupant 80 on social media, a friend of the occupant 80, a family member of the occupant 80, a celebrity, a co-worker of the occupant 80, a person who has similar interest as the occupant 80, and a person who works in the same industry as the occupant 80.

In an exemplary embodiment, the characterizing, with the controller 34, the at least one person of interest 56 at block 212 further includes characterizing, with a cloud computing algorithm 92 in communication with the controller 34, the at least one person of interest 56 as one of friendly or not-friendly based on the data related to the identified people collected from the remote sources 48.

In another exemplary embodiment, the displaying, with the head-up display system 11, the appropriate augmentation graphics 94 onto an inner surface 96 of a windshield 98 of the vehicle 10 at block 216 further includes, moving to block 232, determining, with an occupant monitoring system 78, a location of the occupant's 80 head and eyes, moving to block 234, calculating a location to display the appropriate augmentation graphics 94 on the inner surface 96 of the windshield 98 based on the position of the head and eyes of the occupant 80, wherein the appropriate augmentation graphics 94 appear in proximity to the identified at least one person of interest 56 when viewed by the occupant 80, and, moving to block 236, displaying the appropriate augmentation graphics 94 on the inner surface 96 of the windshield 98 by projecting, with a light source 62 of a digital light projector 50, an excitation light 64, focusing, with a condensing lens 66, the excitation light 64 from the light source 62, splitting, with a color filter 68, the focused excitation light 64 into red, green and blue light, focusing, with a shaping lens 70, the excitation light 64 passing through the color filter 68, re-directing, with a digital micro-mirror device (DMD) 72, the excitation light 64, receiving, with a projection lens 74, the excitation light 64 from the digital micro-mirror device 72, and projecting, with the projection lens 74, the excitation light 64 to the inner surface 96 of the windshield 98 at a location on the inner surface 96 of the windshield 98 based on the position of the head and eyes of the occupant 80, wherein light emitting particles 90 within the windshield 98 emit visible light in response to absorbing the excitation light 64, and the appropriate augmentation graphics 94 appear in proximity to the identified at least one person of interest 56 when viewed by the occupant 80.

In an exemplary embodiment, the method 200 includes, moving to block 238, determining, with the controller 34, if the windshield 98 is in a privacy mode, wherein the windshield 98 is opaque and the external environment 54 is not visible to the occupant 80 through the windshield 98 and the occupant 80 is not visible to persons within the external environment 54. If at block 238, the windshield is not in the privacy mode, then the method 200 moves directly to block 236, wherein the appropriate augmentation graphics 94 are displayed. If, at block 238, the windshield is in privacy mode, then, moving to block 240, the method 200 includes deactivating the privacy mode prior to displaying appropriate augmentation graphics 94 on the inner surface 96 of the windshield 98.

A system and method of the present disclosure offers the advantage of providing information to an occupant within a vehicle of the presence and nature of persons of interest in proximity to the vehicle.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of identifying a person of interest for an occupant within a vehicle with a head-up system, comprising:

identifying, with a controller in communication with an external scene camera adapted to capture images of an external environment in proximity to the vehicle, at least one person of interest to the occupant, that has a connection to the occupant, located within the external environment in proximity to the vehicle;

characterizing, with the controller, the at least one person of interest as one of friendly to the occupant or not-friendly to the occupant;

determining, with the controller, appropriate augmentation graphics related to the identified at least one person of interest to be displayed for the occupant; and displaying, with the head-up display system, the augmentation graphics onto an inner surface of a windshield of the vehicle;

determining, with the controller, if the windshield is in a privacy mode, wherein the windshield is opaque and the external environment is not visible to the occupant through the windshield and the occupant is not visible to persons within the external environment, and when the windshield is in the privacy mode, deactivating the privacy mode prior to displaying appropriate augmentation graphics on the inner surface of the windshield; and after characterization of the at least one person of interest to the occupant:

de-activating the privacy mode, allowing the occupant and the at least one person of interest to the occupant to see one another when the at least one person of interest to the occupant is characterized as friendly to the occupant; and activating the privacy mode preventing the occupant and the at least one person of interest to the occupant from seeing one another when the at least one person of interest to the occupant is characterized as un-friendly to the occupant.

2. The method of claim 1, further including:
sending, via a communication network within the vehicle, information related to the characterization of the at least one person of interest to a vehicle control module of the vehicle, and
initiating, with the vehicle control module, vehicle maneuvers based on the characterization of the identified at least one person of interest.

3. The method of claim 1, wherein the identifying, with a controller in communication with an external scene camera adapted to capture images of an external environment in proximity to the vehicle, at least one person of interest to the occupant, that has a connection to the occupant, located within the external environment in proximity to the vehicle further includes:
scanning, with the external scene camera, the external environment in proximity to the vehicle; and
identifying, with a computer vision algorithm within the controller, people located within the external environment in proximity to the vehicle.

4. The method of claim 3, wherein the identifying, with a computer vision algorithm within the controller, people located within the external environment in proximity to the vehicle further includes:
collecting, from remote sources in communication with the controller, data related to the identified people located within the external environment in proximity to the vehicle; and
identifying, with the controller, at least one person of interest to the occupant, that has a connection to the occupant, within the identified people based on the data collected from the remote sources.

5. The method of claim 4, wherein the collecting, from remote sources in communication with the controller, data related to the identified people located within the external environment in proximity to the vehicle further includes:
collecting data related to the identified people located within the external environment in proximity to the vehicle from at least one of social media applications, criminal records, business networks, motor vehicle records, real estate records, voting records, and school records.

6. The method of claim 5, wherein the identifying, with the controller, at least one person of interest to the occupant, that has a connection to the occupant, within the identified people based on the data collected from the remote sources further includes:
identifying at least one person of interest to the occupant, that has a connection to the occupant, within the identified people who are at least one of: a follower of the occupant on social media, followed by the occupant on social media, a friend of the occupant, a family member of the occupant, a celebrity, a co-worker of the occupant, a person who has similar interest as the occupant, and a person who works in the same industry as the occupant.

7. The method of claim 6, wherein the characterizing, with the controller, the at least one person of interest as one of friendly to the occupant or not-friendly to the occupant further includes:
analyzing, with the controller, the data related to the identified people collected from the remote sources;
determining, with the controller, for each one of the at least one person of interest, if the at least one person of interest has positive or negative feelings toward the occupant based on data, included within the data related to the identified people collected from the remote sources, related to communications and comments made by the at least one person of interest and the occupant; and
characterizing, with a cloud computing algorithm in communication with the controller, the at least one person of interest as one of friendly to the occupant or not-friendly to the occupant based on the data related to the identified people collected from the remote sources.

8. The method of claim 1, wherein the displaying, with the head-up display system, the appropriate augmentation graphics onto an inner surface of a windshield of the vehicle further includes:
determining, with an occupant monitoring system, a location of the occupant's head and eyes;
calculating a location to display the appropriate augmentation graphics on the inner surface of the windshield based on the position of the head and eyes of the occupant, wherein the augmentation graphics appear in proximity to the identified at least one person of interest when viewed by the occupant; and
displaying the appropriate augmentation graphics on the inner surface of the windshield by:
projecting, with a light source of a digital light projector, an excitation light;
focusing, with a condensing lens, the excitation light from the light source;
splitting, with a color filter, the focused excitation light into red, green and blue light;
focusing, with a shaping lens, the excitation light passing through the color filter;
re-directing, with a digital micro-mirror device (DMD), the excitation light;
receiving, with a projection lens, the excitation light from the digital micro-mirror device; and
projecting, with the projection lens, the excitation light to the inner surface of the windshield at a location on the inner surface of the windshield based on the position of the head and eyes of the occupant, wherein light emitting particles within the windshield emit visible light in response to absorbing the excitation light, and the appropriate augmentation graphics appear in proximity to the identified at least one person of interest when viewed by the occupant.

9. A system for identifying a person of interest for an occupant within a vehicle with a head-up system, comprising:
a controller in communication with an external scene camera adapted to:
capture images of an external environment in proximity to the vehicle;
identify at least one person of interest to the occupant, that has a connection to the occupant, located within the external environment in proximity to the vehicle;
characterize the at least one person of interest as one of friendly to the occupant or not-friendly to the occupant;
determine appropriate augmentation graphics related to the identified at least one person of interest to be displayed for the occupant; and
display, with the head-up display system, the augmentation graphics onto an inner surface of a windshield of the vehicle;
the windshield operable in a privacy mode, wherein the windshield is opaque and the external environment is not visible to the occupant through the windshield and the occupant is not visible to persons within the external environment, the controller adapted to determine if the windshield is in a privacy mode, and, when the windshield is in the privacy mode, deactivate the privacy mode prior to displaying appropriate augmentation graphics on the inner surface of the windshield; and after characterization of the at least one person of interest to the occupant:
de-activate the privacy mode allowing the occupant and the at least one person of interest to the occupant to see one another when the at least one person of interest to the occupant is characterized as friendly to the occupant; and
activate the privacy mode preventing the occupant and the at least one person of interest to the occupant from seeing one another when the at least one person of interest to the occupant is characterized as un-friendly to the occupant.

10. The system of claim 9, further including a communication network within the vehicle adapted to send information related to the characterization of the at least one person of interest to the occupant, that has a connection to the occupant, to a vehicle control module of the vehicle, the vehicle control module adapted to initiate vehicle maneuvers based on the characterization of the identified at least one person of interest.

11. The system of claim 9, wherein when identifying at least one person of interest to the occupant, that has a connection to the occupant, located within the external environment in proximity to the vehicle, the controller is further adapted to:
scan, with the external scene camera, the external environment in proximity to the vehicle; and
identify, with a computer vision algorithm within the controller, people located within the external environment in proximity to the vehicle.

12. The system of claim 11, wherein when identifying at least one person of interest to the occupant, that has a connection to the occupant, located within the external environment in proximity to the vehicle, the controller is further adapted to:
collect, from remote sources in communication with the controller, data related to the identified people located within the external environment in proximity to the vehicle; and
identify at least one person of interest within the identified people based on the data collected from the remote sources.

13. The system of claim 12, wherein the controller is adapted to collect data related to the identified people located within the external environment in proximity to the vehicle from at least one of social media applications, criminal records, business networks, motor vehicle records, real estate records, voting records, and school records.

14. The system of claim 13, wherein the controller is adapted to identify at least one person of interest to the occupant, that has a connection to the occupant, who is at least one of: a follower of the occupant on social media, followed by the occupant on social media, a friend of the occupant, a family member of the occupant, a celebrity, a co-worker of the occupant, a person who has similar interest as the occupant, and a person who works in the same industry as the occupant.

15. The system of claim 14, wherein the controller is adapted to:
analyze the data related to the identified people collected from the remote sources;
determine, for each one of the at least one person of interest, if the at least one person of interest has positive or negative feelings toward the occupant based on data, included within the data related to the identified people collected from the remote sources, related to communications and comments made by the at least one person of interest and the occupant; and
utilize a cloud computing algorithm in communication with the controller to characterize the at least one person of interest to the occupant, that has a connection to the occupant, as one of friendly to the occupant or not-friendly to the occupant based on the data related to the identified people collected from the remote sources.

16. The system of claim 9, wherein the head-up display system includes a digital light projector that includes:
a light source adapted to project an excitation light;
a condensing lens adapted to focus the excitation light from the light source;
a color filter adapted to split the focused excitation light into red, green and blue light;
a shaping lens adapted to focus the excitation light passing through the color filter;
a digital micro-mirror device (DMD) adapted to re-direct the excitation light; and
a projection lens adapted to receive the excitation light from the digital micro-mirror device and project the excitation light to the inner surface of the windshield; and
the head-up system includes an occupant monitoring system adapted to receive information related to a position of the head and eyes of the occupant within the vehicle, wherein the digital light projector is adapted to display the augmentation graphics at a location on the inner surface of the windshield based on the position of the head and eyes of the occupant such that the augmentation graphics appear in proximity to the identified at least one person of interest when viewed by the occupant.

17. A vehicle having a head-up display and a system for identifying a person of interest for an occupant therein, comprising:
a controller in communication with an external scene camera adapted to:
scan, with the external scene camera, the external environment in proximity to the vehicle;
capture images of an external environment in proximity to the vehicle;
identify, with a computer vision algorithm within the controller, people located within the external environment in proximity to the vehicle;
collect data related to the identified people located within the external environment in proximity to the vehicle from remote sources including at least one of social media applications, criminal records, business networks, motor vehicle records, real estate records, voting records, and school records;
identify at least one person of interest to the occupant, that has a connection to the occupant, located within the external environment in proximity to the vehicle based on the data collected from the remote sources, wherein, the at least one person of interest is at least one of: a follower of the occupant on social media, followed by the occupant on social media, a friend of the occupant, a family member of the occupant, a celebrity, a co-worker of the occupant, a person who has similar interest as the occupant, and a person who works in the same industry as the occupant;
analyze the data related to the identified people collected from the remote sources;

determine, for each one of the at least one person of interest, if the at least one person of interest has positive or negative feelings toward the occupant based on data, included within the data related to the identified people collected from the remote sources, related to communications and comments made by the at least one person of interest and the occupant;

utilize a cloud computing algorithm to characterize the at least one person of interest as one of friendly to the occupant or not-friendly to the occupant based on the data related to the identified people collected from the remote sources;

determine appropriate augmentation graphics related to the identified at least one person of interest to be displayed for the occupant; and display, with the head-up display system, the augmentation graphics onto an inner surface of a windshield of the vehicle; and a communication network adapted to send information related to the characterization of the at least one person of interest to a vehicle control module of the vehicle, the vehicle control module adapted to initiate vehicle maneuvers based on the characterization of the identified at least one person of interest; and further wherein the windshield is operable in a privacy mode, wherein the windshield is opaque and the external environment is not visible to the occupant through the windshield and the occupant is not visible to persons within the external environment, the controller adapted to determine if the windshield is in a privacy mode, and, when the windshield is in the privacy mode, deactivate the privacy mode prior to displaying appropriate augmentation graphics on the inner surface of the windshield; and after characterization of the at least one person of interest to the occupant:

de-activating the privacy mode allowing the occupant and the at least one person of interest to the occupant to see one another when the at least one person of interest to the occupant is characterized as friendly to the occupant; and activating the privacy mode preventing the occupant and the at least one person of interest to the occupant from seeing one another when the at least one person of interest to the occupant is characterized as un-friendly to the occupant.

18. The vehicle of claim 17, wherein the head-up display system includes a digital light projector that includes:
   a light source adapted to project an excitation light;
   a condensing lens adapted to focus the excitation light from the light source;
   a color filter adapted to split the focused excitation light into red, green and blue light;
   a shaping lens adapted to focus the excitation light passing through the color filter;
   a digital micro-mirror device (DMD) adapted to re-direct the excitation light; and
   a projection lens adapted to receive the excitation light from the digital micro-mirror device and project the excitation light to the inner surface of the windshield; and
   wherein, when displaying, with the head-up display system, the augmentation graphics onto an inner surface of a windshield of the vehicle, the controller is further adapted to receive, via an occupant monitoring system, information related to a position of the head and eyes of the occupant within the vehicle, and display the augmentation graphics at a location on the inner surface of the windshield based on the position of the head and eyes of the occupant such that the augmentation graphics appear in proximity to the identified at least one person of interest when viewed by the occupant.

* * * * *